Patented July 24, 1951

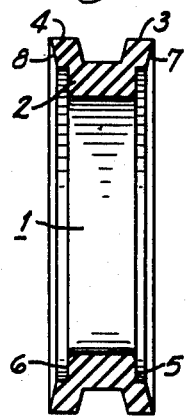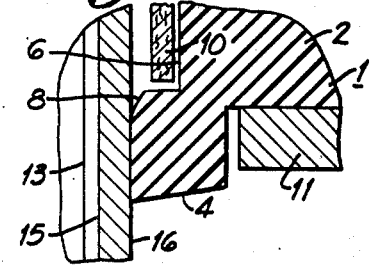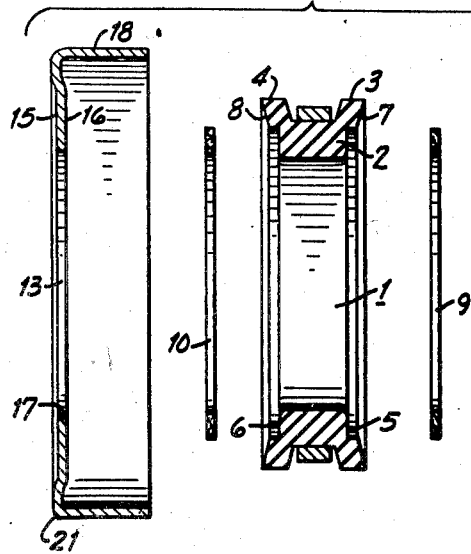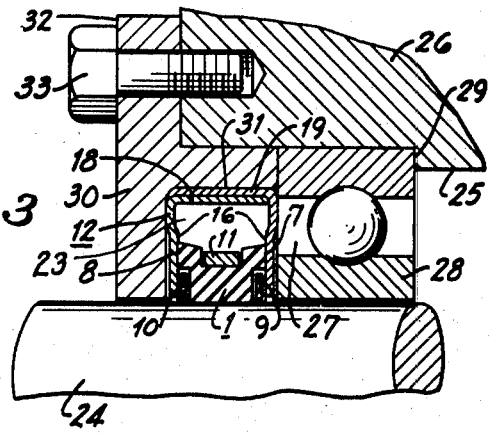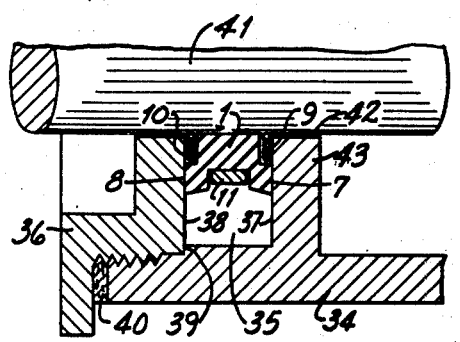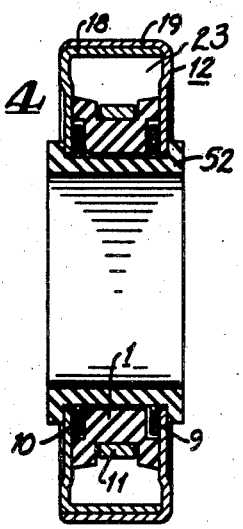

2,561,694

UNITED STATES PATENT OFFICE 2,561,694

ROTARY SEAL

Walter Gilbert, Sr., Indiana, Pa., assignor to Syntron Company, Homer City, Pa., a corporation of Delaware Application October 18, 1946, Serial No. 704,087

2 Claims. (Cl. 286—11.11)

This invention relates generally to apparatus for sealing relatively moving members against leakage of gas or any other fluid therebetween and more particularly for sealing rods or rapidly rotating shafts.

The principal object of this invention is the provision of an efficient and economical seal having a relatively few number of parts and which is applicable to a variety of installations or uses.

Another object is the provision of a unitary sealing member arranged to be seated on one member and seal the other member that has relative rotary motion to the first member.

Another object is the provision of a resilient ceiling member encased in a fixed envelope and which depends upon the inherent resiliency of the sealing member to produce the seal.

Other objects and advantages appear from the following description and claims.

A practical embodiment illustrating the principles of this invention is shown in the accompanying drawing wherein:

Fig. 1 is a sectional view of the sealing member shown as a free body.

Fig. 2 is an exploded view in section showing all of the parts of the unitary seal.

Fig. 3 is a sectional view showing the assembled unitary seal applied to a shaft.

Fig. 4 is a sectional view showing the assembled unitary seal with a resilient protector applied thereto for shipment.

Fig. 5 is an enlarged sectional view of a portion of the structure shown in Fig. 3.

Fig. 6 is an enlarged sectional view of a modified form of this invention.

Referring to Fig. 1, the sealing member 1 is an annular sleeve of solid elastic or abrasion resistant resilient material, such as rubber, plastic, "neoprene," "Ameripol" or the like. The word "rubber" as used in the description and claims is defined to include any of these materials. "Neoprene" is a trade name of a material believed to be made up of polymerized chlorobutadiene and "Ameripol" is a trade name of a material believed to be made up of a copolymer of acrylonitrite and butadiene. This sleeve is in the form of a spool having a body section 2 with integral spaced, outwardly projecting annular flanges 3 and 4 at the ends of the sleeve. The flanges flare outwardly, deviating from each other when the sealing member is a free body as shown in Fig. 1. The roots of the flanges form a part of the body portion 2. The spool sealing member 1 is provided with the annular recesses 5 and 6 on the ends thereof.

The outer faces 7 and 8 of the flanges 3 and 4 provide the sealing surfaces. A sufficient amount of material is provided in the flanges to provide an outward resilient force when flexed and to permit a considerable amount of wear on these sealing faces. However, an anti-frictional coating, such as a graphite, is applied to these sealing faces to prevent undue wear.

The recesses 5 and 6 are arranged to receive the guard members or washers 9 and 10 respectively, as shown in Fig. 2. These washers may be made of any suitable material but are preferably cut from paperboard or fiber and when assembled in their respective recesses they have considerable clearance with the bore of the sleeve as well as from the sealing faces 7 and 8 as shown in Fig. 5. These washers guard against the extrusion longitudinally of the flexible rubber sleeve 1 due to axial movement of the shaft or member on which it is mounted.

A driving friction retaining band 11 is mounted around the body 2 of the sleeve between the flanges 3 and 4 as shown in Fig. 2. This band is preferably made of metal and its inner diameter is preferably slightly less than the diameter of the sleeve body to provide a driving grip by the latter on the surface of the member on which it is mounted. Adequate clearance is provided between the ends of the band 11 and the flanges 3 and 4 of the sleeve when the latter is assembled in its housing 12 to permit fluid pressure to be effective on the flange surface. However if it is desired to provide initial lateral compressive force on the flanges the band may be made wider but in such case the external diameter of the band should not be greater than the flanges.

The housing 12 is made up in two halves, the male section 13 and the female section 14. The housing sections are cup shaped with their radial portion dished inwardly as shown at 15. These housing sections are preferably made of metal and the inner face 16 of the dished portion is formed to be an unblemished true radial face normal to the axis of the opening 17 in the radial portion. This opening is greater in diameter than the hole in the washers 9 and 10 which in turn are greater in diameter than the bore of the sleeve 1 as shown in Fig. 3.

The axial flange 18 of the male housing section 13 is formed to snugly fit into the axial flange 19 of the female housing 14 which provides a fluid tight joint. Thus the housing is assembled by pressing the axial flange of the male section into the female section and the accuracy in forming these axial flanges maintains the friction sealing surfaces 16 normal to the axis of the housing. The depth of the male flange 18 acts as a gauge in determining the distance between the sealing faces 16 of the housing members as the flange 18 bottoms against the undished portion of the female housing section 14. The outer edge of the flange 19 of the housing section 14 is beveled as shown at 20 so that it may be spun or peened over the rounded corner 21 of the housing section 13, as shown in Fig. 3, to lock the members together and increase the sealing effect of this joint.

When the band 11 and the guard washers are assembled on the sealing member and the latter is placed in the housing section 13, the housing section 14 is pressed thereon and the edge 20 is then spun or pressed over to complete the unitary seal member. This assembly accurately gauges the pressure exerted by the flanges on sealing surfaces 16. When assembled as shown in Fig. 5 a greater portion of the sealing faces 7 and 8 of the flanges are in engagement with the sealing faces 16 of the housing as the flange faces are disposed at a slight angle to the wearing faces 16. The flexing of the flanges created by the gauge action of the flange 18 provides a constant initial pressure by the flanges against the sealing surfaces 16 of the housing sections. This initial force is sufficient to provide a seal between the chamber 23 and either side of the sealing member when the bore of the sleeve is sealed on a shaft.

An illustration of the application of the seal is shown in Fig. 3 wherein the shaft 24 extends through the opening 25 in the casing 26. The casing is provided with a sealing chamber 27 sufficiently large in diameter to receive the seal member. The shaft 24 is supported by the antifriction bearing 28 the outer race of which is seated against the shoulder 29 in the opening 25. A gland member 30 is provided with an inner annular chamber 31 in which the housing 12 of the sealing member is inserted, it being preferable to form the chamber 31 so that the housing 12 is required to be press-fitted into place as shown in Fig. 3. Thus any heat developed by the friction of the flanges 7 and 8 against the inner annular surfaces 16 of the housing 12 due to high speeds of the shaft 24 may be dissipated directly to the gland member 30. The gland member 30 is provided with an annular flange 32 having a series of spaced openings for receiving the clamping bolts 33 which engage the aligned threaded holes in the housing for the purpose of clamping the gland member 30 to the casing 26. The flange 32 of the gland member 30 may be provided with a suitable sealing washer for sealing the gland member relative to the casing 26. In this manner the exterior of the seal member may be sealed relative to the casing 26. The gland member 30 may be drawn up very tightly without distorting or otherwise harming the sealing faces 16 of the housing sections 13 and 14. If the assembly of the sealing member requires any pressure axially of the casing 12 the axial flanges 18 and 19 provide excellent support for the full circumference of the sealing member against a clamping pressure.

The shaft 24 is preferably slightly larger in diameter than the diameter of the bore of the sleeve when the band 11 is not mounted thereon. With the band in place the diameter of the bore of the sleeve may be further reduced and the sealing member 1 must be further deformed to slide it on the shaft. However the guard washers 9 and 10 prevent the sealing member from rolling or extruding out of the housing along the shaft.

When in place as shown in Fig. 3 the bore of the resilient sealing member 1 grips the shaft 24. The guard washers 9 and 10 are spaced from the shaft and have clearance with the sealing faces 16 in the housing. The bore of the openings 17 in the housing sections are spaced further from the shaft 24 than the guard rings and ample clearance is allowed between the casing opening 25 and the gland member 30 with respect to the shaft 24.

A reasonable amount of misalignment of the shaft 24 or a wobbling action due to an unbalanced shaft will flex the resilient sealing member 1 but will not interrupt the sealing action of the flanges. As the shaft 24 rotates the friction grip by the resilient sealing member 1 causes it to rotate with the shaft and rotary contact occurs between the faces 7 and 8 of the flanges and the sealing surfaces 16 on the housing sections. If the chamber 31 in the casing 26 contains fluid under pressure it will move out through the opening 25 and travel radially up past the flange 3 to the chamber 23 of the sealing member. When the pressure in the chamber 23 approaches the pressure in the chamber 27 the sealing face 7 of the flange 3 is effective in producing a seal on the inside while the surface of the flange 4 is effective in maintaining its seal all the time. Fluid under pressure in chamber 23 acts on the flange surfaces to increase the contact pressure between the faces 7 and 8 and their respective housing sealing surfaces 16.

One of the important features of this improvement lies in the fact that the sealing surfaces, between which relative movement is had, can be manufactured with precision and when the sealing member is assembled there is nothing to harm these surfaces. This unitary seal does not depend upon the construction of the device on which it is applied as no accurate surfaces are required of the device being sealed. The sealing unit literally floats relative to the shaft and the relatively moving parts can not shift sufficiently to prevent proper sealing action. The sealing member 1 which grips the shaft produces an adequate seal even though the shaft wobbles or vibrates, as such movement is taken up by the body 2 and does not affect the sealing action of the faces of the flanges 3 and 4.

During shipment and nonuse the sealing unit is protected by the flexible resilient spool 52 as shown in Fig. 4. This spool may be made of rubber or other suitable material and when placed on the sealing unit as shown, it keeps the dust, dirt and other foreign matter from collecting on the interior of the unit. It is readily applied and removed and prevents failures due to foreign matter that may be deposited on the unit when handled or stored, which is important for this seal.

In the structure shown in Fig. 6, the rotary shaft 41 is arranged to extend through the opening 42 in the wall 43 of the housing 34. The housing is provided with a circular sealing chamber 35 arranged to be closed by the gland member 36 which threadably engages the outer bore of the sealing chamber 35. The surface 37 of the wall 33 and the inner surface 38 of the gland member 36 are substantially parallel and are polished as they form the sealing engaging surfaces for the flanges 7 and 8 of the sealing member 1. The gland member 36 bottoms against the stop shoulder 39 in the chamber 35 after it has compressed the gasket 40 to seal the gland relative to the housing 34.

In view of the fact that the seal engaging surfaces 37 and 38 form a part of the housing and the gland member respectively, any heat produced due to the frictional engagement between the rotary sealing member 1 and these surfaces is quickly dissipated and the shaft 31 is sealed against leakage of fluid in either direction.

The flanges of the rubber sleeve member 1 are designed to flare outwardly, deviating from one another and are provided with a mass of material uniformly distributed therearound. When the rubber is mounted on a rotary shaft, the centrifugal force due to this mass causes the flanges to move toward one another in an effort to straighten out radially, thereby reducing the frictional engaging pressure against the polished sealing surfaces even though the chamber between the flanges is subjected to the pressure of the fluid being sealed. This is an important object of this invention.

I claim:

1. In a rotary shaft seal arranged to be slid over a shaft and mounted as a unit in sealed relation against the device through which the shaft extends, the combination of a housing having end walls with aligned openings to receive the shaft, a perimetral wall connecting the end walls to form an annular chamber, a rubber sleeve mounted in the housing chamber and having annular flanges on the ends thereof engaging the walls with an initial force to seal therewith, an annular recess in each flange adjacent the bore of the sleeve, a guard ring in each recess spaced from said walls and the shaft, and the bore of the sleeve being sufficiently small to grip and seal on the shaft and rotate the sleeve relative to the walls of the housing.

2. In a fluid pressure seal between concentric members having relative rotary movement, the combination of an elastomer sleeve mounted in sealing relation on one member and having spaced flexible circular flanges projecting toward the other member and away from each other when a free body, an annular end sealing face on each flange, spaced walls carried by the other member providing adjacent polished surfaces which overlap and confine the flanges to frictionally engage the sealing faces in continuous rotary contact to provide a rotary seal therebetween, said sealing faces being smaller than and spaced from the edge of said walls, and a balanced mass on the flanges of the seal member arranged to decrease the frictional contact pressure on the polished wall surfaces when the sleeve is rotated at an increasing rotary speed.

WALTER GILBERT, SR.

REFERENCES CITED

The following references are of record in the file of this patent:

UNITED STATES PATENTS

| Number | Name | Date |
|---|---|---|
| 1,931,733 | Leibing | Oct. 24, 1933 |
| 2,210,823 | Victor et al. | Aug. 6, 1940 |
| 2,367,403 | Kosatka | Jan. 16, 1945 |
| 2,383,667 | Matter | Aug. 28, 1945 |
| 2,420,040 | Frisby et al. | May 6, 1947 |

FOREIGN PATENTS

| Number | Country | Date |
|---|---|---|
| 318,775 | Great Britain | of 1929 |